United States Patent [19]

Conkle

[11] Patent Number: 4,861,354

[45] Date of Patent: Aug. 29, 1989

[54] REMOVING POLLUTANT

[75] Inventor: H. Nicholas Conkle, Columbus, Ohio

[73] Assignee: Battelle Memorial Institute, Columbus, Ohio

[21] Appl. No.: 226,252

[22] Filed: Jul. 29, 1988

[51] Int. Cl.⁴ .............................................. B01D 41/00
[52] U.S. Cl. ............................................ 55/96; 55/97; 55/296; 55/300; 55/512; 55/476
[58] Field of Search ...................... 55/96, 97, 296, 300, 55/474, 476, 512

[56] References Cited

U.S. PATENT DOCUMENTS

| | | | |
|---|---|---|---|
| 1,538,985 | 5/1925 | Greene | 55/300 |
| 1,608,678 | 11/1926 | Smith | 55/296 |
| 1,706,676 | 3/1929 | Paasche | 55/319 |
| 2,021,853 | 11/1935 | Curley | 55/97 |
| 2,952,331 | 9/1960 | Beach | 55/323 |
| 2,995,204 | 8/1961 | Prostshakov | 55/474 |
| 4,764,191 | 8/1988 | Morelli | 55/302 |

FOREIGN PATENT DOCUMENTS 406959 12/1924 Fed. Rep. of Germany ........ 55/322

Primary Examiner—Bernard Nozick
Attorney, Agent, or Firm—Philip M. Dunson

[57] ABSTRACT

Methods and apparatus for removing a pollutant from a fluid stream. A nested array of fibers (1) is provided in a substantially confined region (2). The pollutant-containing fluid stream (4) is passed through a substantial portion of the nested array (1) from an inlet area (7) therein to a fluid-outlet area (8) that is spaced apart substantially from the inlet area (7). A substantial fraction of the pollutant (9) is separated from the fluid stream (4) in a portion of the nested array (1) generally nearer to the inlet area (7) than to the fluid-outlet area (8), and a substantial fraction of the separated pollutant (9) is removed from the nested array (1) at a pollutant-outlet area (12) that is spaced apart from the inlet area (7) and from the fluid-outlet area (8), while the fluid stream (4) may continue to pass through the nested array (1).

9 Claims, 1 Drawing Sheet

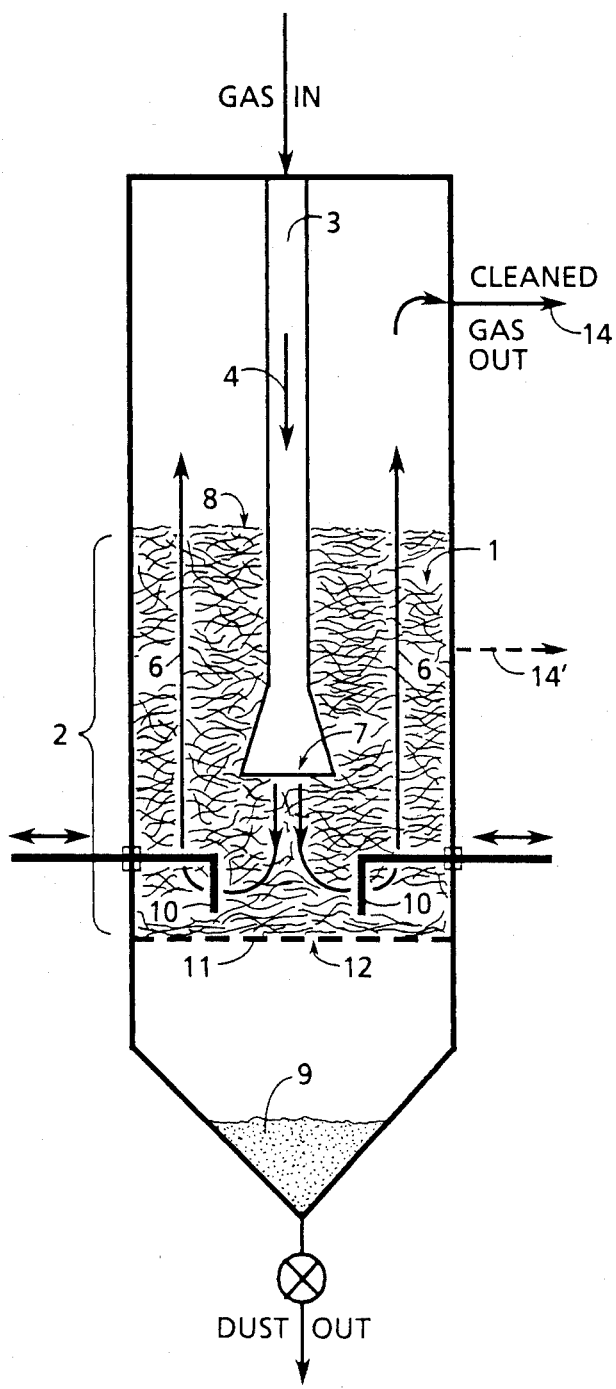

REMOVING POLLUTANT

FIELD

This invention relates to methods and apparatus for removing pollutants from fluid streams. It is especially useful in the removal of particles having diameters in the range of about 50 micrometers or less from fluid streams.

In typical methods and apparatus according to the present invention for removing a pollutant from a fluid stream, a nested array of fibers is provided in a substantially confined region, and the pollutant-containing fluid stream is passed through a substantial portion of the nested array from an inlet area therein to a fluid-outlet area that is spaced apart substantially from the inlet area. A substantial fraction of the pollutant is separated from the fluid stream in a portion of the nested array generally nearer to the inlet area than to the fluid-outlet area, and a substantial fraction of the separated pollutant is removed from the nested area at a pollutant-outlet area that is spaced apart from the inlet area and from the fluid-outlet area, while the fluid stream may continue to pass through the nested array.

BACKGROUND

The removal of particulate matter from air streams is typically done now with baghouses or electrostatic precipitators and from liquids with screens or filters. Baghouses usually employ fabrics which serve as the support for the buildup of a filter cake. Periodically, the filter cake is shaken or blown loose from the fabric and collected, and the cycle is repeated.

Typical pressure drops are on the order of 10-20 cm WC (water column). As might be expected, there is some loss of efficiency after the cake is removed during the cleaning cycle and there tends to be a relatively high pressure drop during the latter phase of filtration just prior to cleaning. Furthermore, baghouse fabrics may blind due to lodging of fine particles or sticky materials in the pores of the fabric.

In addition to commercial baghouses and electrostatic precipitators, research and development work has been done on recirculating, granular-bed filters. These filters comprise a bed of granules in which the granules are recycled out the bottom of the bed, cleaned, and returned to the top. Dirty gas flows from side to side or from bottom to top, countercurrent to the granule movement.

DISCLOSURE

A typical method according to the present invention for removing a pollutant from a fluid stream comprises providing a nested array of fibers in a substantially confined region, passing the pollutant-containing fluid stream through a substantial portion of the nested array from an inlet area therein to a fluid-outlet area of the nested array that is spaced apart substantially from the inlet area, separating a substantial fraction of the pollutant from the fluid stream in a portion of the nested array generally nearer to the inlet area than to the fluid-outlet area, and removing a substantial fraction of the separated pollutant from the nested array at a pollutant-outlet area that is spaced apart from the inlet area and from the fluid-outlet area, while continuing to pass the fluid stream through the nested array.

Typically the inlet area is substantially below the level of the top of the array, and the fluid stream passes predominantly upward to the fluid-outlet area, at the level of the top of the array. The pollutant-outlet area typically is at the level of the bottom of the array.

The pollutant typically is removed by vigorously moving the fibers repeatedly in a substantial portion of the array between the inlet area and the pollutant-outlet area and directing the pollutant outward through the pollutant-outlet area. Typically the pollutant is shaken off the fibers by providing reciprocating movement thereto, and the pollutant is moved by the force of gravity through the pollutant-outlet area, where a perforated plate or screen enables the pollutant to pass through the area while retaining the fibers within the nested array.

Typical apparatus for carrying out the invention comprises a combination of means for performing the steps described above.

It has been found that the dendritic capture may be increased and the pressure drop decreased by increasing voidage. This leads to lower operating costs. One of the advantages of a fiber filter over a granular filter is the ability to develop and control this high voidage. The term voidage is intended to mean the percentage of a particular space that is empty of solids. It is calculated by determining the volume of the filter occupied by fibers, $V_f$, as by dividing the mass of fibers by the density of the fiber material. The volume of empty space is then the total filter volume less the volume of fibers, $V_T$-$V_f$, and the voidage is the empty volume expressed as a fraction of the total volume, voidage=

$$\frac{V_T - V_f}{V_T}.$$

The high voidage is created by a nesting or loose packing phenomenon. It has been found that high-aspect-ratio fibers tend to nest in a rather rigid, high voidage array when they are loosely poured into a container. The nesting is a matter of degree. For capturing fine particles in the 1-20 micrometer range, fibers in the range of about 0.075 to 2 mm diameter and aspect ratios of above about 20 are preferred in the present invention. The voidage appears to vary linearly with aspect ratio of the fibers. The preferred voidage is on the order of 90-96 percent.

The nesting of fibers also provides a second advantage over the packing of granules in the granular-bed filters. The fiber nests tend to be quite rigid compared with the loose granules. Thus, dendritic formations contributing to good capture are retained in the cohesive fiber bed as the bed shifts downward during operation. On the contrary, dust captured between bed granules can be lost by the downward movement of the loose granules in a granular bed filter.

The fibers may be made of any useful material including both organic and inorganic materials. They may merely physically capture a particulate or they may react chemically with a particulate or gas. The fibers may also be catalytic or be coated with inert, reactant, or catalytic material. For example, metal fibers may have a catalytic coating to convert $SO_2$ in flue gas to $SO_3$, or a lime coating that can react with the $SO_2$ to produce a $CaSO_4$ deposit on the fiber.

Refractory fibers, as well as metal fibers, can be used for high temperature applications. For example, catalytic cracking of high-boiling hydrocarbons to gasoline fractions can take place at about 500 C. with fibers made or coated with modified, hydrated alumina silicates. Deposited carbon can be removed by burning in air in the regenerator.

An advantage of the present invention is the high face velocity that is possible for effective filtration at low pressure drop. Face velocities of 200 fpm are possible compared to velocities of 2–4 fpm for bag filters.

The present invention provides reliable operation at high temperatures, such as 2000 F. and above, and at high pressures, such as 350 psig and above, as well as at lower temperatures and pressures. Other advantages include operation with lower pressure drops than are usually obtained with known apparatus, higher reliability, and the ability to operate continuously without interruption for cleaning. Pollutant may be removed from the apparatus either continuously or intermittently along with the filtering operation, or when the filter is not being used.

High temperature, high pressure (HTHP) gases from operations such as pressurized fluid-bed combustion (PFBC), integrated gasifications combined cycle (IGCC), and direct coal-fired turbines require very efficient particle control. The present invention provides such control.

In a typical embodiment of the invention, as shown in the drawing, hot HTHP gas passes downward through an injection tube and then into a nested fiber filter (NFF) bed. The gas passes downward, turns, and then passes upward through the NFF bed. During the passage, the particulate matter is collected on the fibers, and thus is removed from the stream of hot gas. This arrangement eliminates the passage of the hot, particulate-laden gas through a perforated plate as used in previous designs to separate the gas from the NFF bed. By eliminating this perforated plate, overall pressure drops are reduced, so energy losses are less. Also reliability is increased, as the perforated plate comprises a major erosion point, and thus a weakness in HTHP design.

In addition, the present design allows continuous operation, with continuous feed of dirty gas and continuous removal of the collected dust from the bed. Prior designs have required staged operation where the filtering unit must be taken off line, cleaned, and then returned to service. The required valving, depressurization, and heat loss are all undesirable from an efficiency standpoint. By providing a deep bed of fibers, the bottom section can be selectively vibrated, causing the collected dust to separate from the heavily loaded bottom fibers and fall through a bottom perforated plate and into a dust collection reservoir. This dust can then be removed, depressurized, cooled, and sent to disposal.

BRIEF DESCRIPTION OF DRAWING

The drawing is a schematic front sectional view of typical apparatus according to the present invention for removing a pollutant from a fluid stream.

DESCRIPTION OF THE INVENTION

Typical apparatus according to the present invention for removing a pollutant from a fluid stream comprises a nested array of fibers 1 in a substantially confined region 2, means including an inlet pipe 3 for passing the pollutant-containing fluid stream 4 through a substantial portion of the nested array 1, as indicated by the arrows 6, from an inlet area 7 therein to a fluid-outlet area 8 of the nested array 1 that is spaced apart substantially from the inlet area 7. The fibers in the array 1 constitute means for separating a substantial fraction of the pollutant 9 from the fluid steam 4 in a portion of the nested array 1 generally nearer to the inlet area 7 than to the fluid-outlet area 8, and mostly near or below the level of the inlet area 7. Vibrating rods 10 and a perforated plate 11 constitute means for removing a substantial fraction of the separated pollutant 9 from the nested array 1 at a pollutant-outlet area 12 that is spaced apart from the inlet area 7 and from the fluid-outlet area 8, while the fluid stream 4 may continue to pass through the nested array 1.

Typically the inlet area 7 is substantially below the level of the top 8 of the array 1, and the fluid stream 4 passes predominantly upward, as indicated at 6, to the fluid-outlet area 8, at the level of the top of the array 1. The pollutant-outlet area 12 typically is at the level of the bottom of the array 1.

As shown in the drawing, the cleaned gas typically flows out through the fluid-outlet area 8 and further upward and on through an outlet pipe 14 located above the top of the nested array 1. Other lower locations for the outlet pipe may be preferred for some applications, however, such as the alternative location indicated at 14'.

The pollutant 9 typically is removed by means 10 for vigorously moving the fibers repeatedly in a substantial portion of the array 1 between the inlet area 7 and the pollutant-outlet area 12, and means 11 for directing the pollutant 9 outward through the pollutant-outlet area 12. Typically the pollutant 9 is shaken off the fibers 1 by providing reciprocating movement thereto, and is moved by the force of gravity through the pollutant-outlet area 12, where a perforated plate or screen 11 enables the pollutant 9 to pass through the pollutant-outlet area 12 while the fibers are retained within the nested array 1. The fibers may be vibrated by mechanically contacting means 10, as shown, or by noncontacting means for directing sonic or ultrasonic acoustic energy to the fibers.

Some of the advantages of the present invention over prior NFF methods and apparatus are brought out in the following edited excerpts from Supplemental Report on Development of a Novel Nested-Fiber Filter Concept for High-Temperature and High-Pressure Physical Cleanup; Hot Model-Additional IR&D Study (Task 3 Supplemental) to Battelle Columbus Division; July 18, 1988 (Battelle Columbus Division, 505 King Avenue, Columbus, Ohio 43201-2693).

The entire report, filed as an appendix to this specification, contains further relevant information. It is hereby incorporated by reference into this patent.

Battelle has developed a system to allow elevated-temperature particulate capture. At the conclusion of the Task-3 effort, we found that the conventional NFF could not work satisfactorily at temperatures beyond 936 K (1226 F). However, by operating the NFF in a "screenless" (i.e., without a fiber-retaining screen) mode, the working-temperature range was extended to 1,106 K. (1532 F.). Not only was collection efficiency an excellent 99.55 percent, but pressure drop was reduced from over 100 in. water to only 6 in. water. The development means that the NFF is well situated to provide high efficiency, reliable particulate control for Integrated Gasification Combined Cycle (IGCC) and Pressurized Fluidized-Bed Combustion (PFBC) applications.

RUN 75

Operation of the conventional NFF at temperatures above 1225 F. results in severe plugging of the support screen, unacceptable pressure drop and the likelihood that fiber cleaning, necessary for continuous operation, would not be possible.

Others have experienced similar problems with processes using a screen support, such as in a typical granular-bed filter. Therefore, Run 75 was conducted in a screenless-NFF mode. The configuration of the basic test facility was maintained, but the filter arrangement, contained within the externallty heated reactor, was modified. In this configuration, no basket was used, instead fibers were dropped in from the top and the walls of the reactor formed the filter container. To keep the filters in the hot zone of the reactor, the bottom 1,550 mm (61 in.) were filled with ceramic rings. The next 560 mm (22 in.) were filled with the 13-mm fibers. CO was introduced approximately 280 mm (11 in.) from the top of the fiber bed. A deeper bed depth was used to allow the CO to burn and raise the filter temperature to the desired level. Air and flyash were flowed upward through the bed and passed out through the reactor top exit. The gases were cooled, depressurized, and passed through the ultimate filter. Thermocouples were located 150 mm (6 in.) into the bed and 150 mm (6 in.) above and 915 mm (36 in.) above the fiber bed.

Filter performance in this mode was excellent! Collection efficiency was maintained high (99.55 percent) and pressure drop was only 6.1 in. of water (compared to 111 in. water in Run 71 or 227 in. water in Run 74). No plugging was observed and after 2 hours and 23 minutes the run was shut down on schedule. The pressure drop versus time histories for Runs 71 through 75 show the dramatic improvement in performance. The screenless NFF bad pressure drop levels even lower than the lower-temperature screened NFF tests which are typically 20 to 25 in. water. Peak in-filter temperature (1086 K., 1,496 F.) was slightly lower than peak temperatures for Runs 71, 73, and 74 (1,576, 1,678 and 1,663 F.), but still above the temperature where the onset of filtration problems had been observed in the previous runs. Photographs of fibers removed from the reactor after the run show that the flyash was not agglomerated onto the fibers. They remain discrete fibers, amenable to standard cleaning techniques.

The accumulated with-screen data indicate that elevated temperature, over the 285 to 936 K. (54 to 1226 F.) range tested, does not adversely affect collection efficiency and only slightly increases pressure drop. However, in Runs 71, 73, and 74 with a peak-exit temperature of 1,130 to 1,154 K. (1,576 to 1,684 F.) the flyash exhibited a tendency to become compressive, sticky and agglomerate on the fiber-retaining screen. Since the flyash temperature during these runs may have been as high as 1300 K. (1870 F.) based on the findings in Runs 73 and 74 that inlet temperatures are over 300 F. higher than the average outlet temperatures) it is not surprising that the flyash characteristics were different.

In contrast, Run 75, operated at similar high flyash temperatures, but without the fiber-retaining screen, did not experience the agglomeration problem.

It appears clear that the problems encountered with conventional NFF are a combination of temperature (with consequent changes in the flyash physical properties) and the presence of fiber-retaining screen. The problems do not appear to be related to the flyash type (similar problems were encountered with both the PFBC and the atmospheric fluid-bed combustion (AFBC) material); nor to the combustion of CO used to obtain the higer temperature.

The solution to the problem of elevated-temperature operation appears to be operation in the screenless mode. Collection efficiency and pressure drop can be maintained at excellent levels, even with the very fine 5-$\mu$m PFBC flyash, by operation in a screenless, upflow filtration mode as in the present invention.

While the forms of the invention herein disclose constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

What is claimed is:

1. A method for removing dust from a gas stream comprising
    providing a nested array of fibers in a substantially confined region in housing means, the nested array having a voidage of about 90 to 96 percent,
    passing the dust-containing gas stream predominantly upward through a substantial portion of the nested array from inlet conduit means communicating with an inlet area therein substantially below the level of the top of the array to a gas-outlet area at the level of the top of the nested array that is spaced apart substantially from the inlet area, from which gas-outlet area the gas may flow on through outlet means above the nested array to its intended destination,
    separating a substantial fraction of the dust from the gas stream in a portion of the nested array generally nearer to the inlet area than to the gas-outlet area and mostly near or below the level of the inlet area, and
    removing a substantial fraction of the separated dust from the nested array at a dust-outlet area at the level of the bottom of the array that is spaced apart from the inlet area and from the gas-outlet area, while continuing to pass the gas stream through the nested array, by vigorously moving the fibers repeatedly in a substantial portion of the array between the inlet area and the dust-outlet area and directing the dust outward through the dust-outlet area.

2. A method as in claim 1, wherein dust is shaken off the fibers by providing reciprocating movement thereto.

3. A method as in claim 1, wherein the dust is moved through the dust-outlet area by the force of gravity.

4. A method as in claim 1, wherein a perforated plate or screen at the dust-outlet area enables the dust to pass through the area while retaining the fibers within the nested array.

5. Apparatus for removing dust from a gas stream comprising
    a nested array of fibers in a substantially confined region in housing means, the nested array having a voidage of about 90 to 96 percent,
    means for passing the dust-containing gas stream predominantly upward through a substantial portion of the nested array from inlet conduit means communicating with an inlet area therein substantially below the level of the top of the array to a gas-outlet area at the level of the top of the nested array that is spaced apart substantially from the inlet area, from which gas-outlet area the gas may flow on through outlet means above the nested array to its intended destination, means for separating a substantial fraction of the dust from the gas stream in a portion of the nested array generally nearer to the inlet area than to the gas-outlet area and mostly near or below the level of the inlet area, and means from removing a substantial fraction of the separated dust from the nested array at a dust-outlet area at the level of the bottom of the array that is spaced apart from the inlet area and from the gas-outlet area, while the gas stream may continue to pass through the nested array, comprising means for vigorously moving the fibers repeatedly in a substantial portion of the array between the inlet area and the dust-outlet area and means for directing the dust outward through the dust-outlet area.

6. Apparatus as in claim 5, wherein dust is shaken off the fibers by means for providing reciprocating movement thereto.

7. Apparatus as in claim 5, wherein the dust is moved through the dust-outlet area by the force of gravity.

8. Apparatus as in claim 5, comprising means for enabling the dust to pass through the dust-outlet area while retaining the fibers within the nested array.

9. Apparatus as in claim 8, wherein the said enabling means comprises a perforated plate or screen.

* * * * *